(12) United States Patent
Sun et al.

(10) Patent No.: US 8,345,977 B2
(45) Date of Patent: Jan. 1, 2013

(54) DOCUMENT IMAGE PROCESSING METHOD AND APPARATUS

(75) Inventors: Jun Sun, Beijing (CN); Yoshinobu Hotta, Kawasaki (JP); Hao Yu, Beijing (CN); Satoshi Naoi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 13/067,247

(22) Filed: May 18, 2011

(65) Prior Publication Data

US 2012/0045129 A1 Feb. 23, 2012

(30) Foreign Application Priority Data

Aug. 17, 2010 (CN) .......................... 2010 1 0257650

(51) Int. Cl.
*G06K 9/34* (2006.01)
*G06K 9/00* (2006.01)
(52) U.S. Cl. ........................................ 382/176
(58) Field of Classification Search .................. 382/173, 382/176, 178, 180, 190; 358/1.11, 462; 715/200, 715/229, 511
See application file for complete search history.

(56) References Cited

U.S. PATENT DOCUMENTS

| 5,335,290 | A * | 8/1994 | Cullen et al. ............... 382/176 |
| 5,774,579 | A * | 6/1998 | Wang et al. ............... 382/176 |
| 6,850,645 | B2 * | 2/2005 | Naoi et al. ............... 382/190 |
| 7,929,765 | B2 * | 4/2011 | Sun et al. ............... 382/182 |
| 7,930,627 | B2 * | 4/2011 | Ming ............... 715/229 |
| 2005/0201619 | A1 * | 9/2005 | Sun et al. ............... 382/176 |
| 2010/0220930 | A1 * | 9/2010 | Sun et al. ............... 382/190 |
| 2011/0199627 | A1 * | 8/2011 | Tzadok ............... 358/1.11 |
| 2012/0045129 | A1 * | 2/2012 | Sun et al. ............... 382/176 |
| 2012/0134581 | A1 * | 5/2012 | Matsuda ............... 382/164 |

OTHER PUBLICATIONS

F. Shafait, D. Keysers, T. Breuel, "Performance evaluation and benchmarking of six page segmentation algorithms". IEEE Trans. on Pattern Analysis and Machine Intelligence. v30, n6, pp. 941-954, Nov. 30, 2007.
E. Kim, et al, "Scene text extraction using focus of mobile camera". Proceedings of the 10th International conference on Document Analysis and Recognition, p. 166-170, Jul. 26-29, 2009, Barcelona.
N. Ezaki, et. al, "Text detection from natural scene images: towards a system for visually impaired persons". International Conference on Pattern Recognition. p. 683-686, 2004.

\* cited by examiner

*Primary Examiner* — Amir Alavi
(74) *Attorney, Agent, or Firm* — Staas & Halsey LLP

(57) ABSTRACT

A method for processing a document image includes: performing horizontal and vertical text line extraction on the document image; providing an overlapping matrix, a value of an element of the overlapping matrix indicating an overlapping relation between horizontal and vertical text lines; merging the overlapping matrix in the vertical and horizontal direction; determining one or more text overlapping regions in the document image, based on the values of the elements of the merged overlapping matrix; counting the total number of strokes or pixel points in the horizontal and vertical text lines, respectively, within one of the one or more text overlapping regions; and determining an orientation of the text overlapping region is horizontal if the total number of strokes or pixel points in the horizontal text lines is larger than that in the vertical text lines, otherwise, determining the orientation is vertical.

8 Claims, 4 Drawing Sheets

This is a sample horizontal text line
This is a horizontal text line
Horizontal-text-line
Text line         V-2
   V-1

V-3  V-4  V-5  V-6 V-7 text-line
vertical text-line
This is a vertical text line
line
This is a sample vertical text

DOCUMENT IMAGE PROCESSING METHOD AND APPARATUS

CROSS REFERENCE TO RELATED APPLICATIONS

This application claims the benefit of Chinese Application No. 201010257650.6, filed Aug. 17, 2010, the disclosure of which is incorporated herein by reference.

FIELD OF THE INVENTION

The present invention relates to the field of image processing, and in particular, to a method and apparatus for processing a document image.

BACKGROUND OF THE INVENTION

Text line extraction is a key step in document image processing. There are two main types of conventional methods to obtain text lines from images. The first type uses layout analysis to separate text paragraph from images and to extract the text lines. Another type uses idea of text extraction from natural scene images. Reference can be made to the following relevant technical documents: F. Shafait, D. Keysers, T. Breuel, "Performance evaluation and benchmarking of six page segmentation algorithms". IEEE Trans. On Pattern Analysis and Machine Intelligence. v 30, n 6, pp 941-954, Nov. 30, 2007 (hereinafter referred to as technical document 1); and E. Kim, et Al, "Scene text extraction using focus of mobile camera". Proceedings of the 10th International conference on Document Analysis and Recognition, p 166~170, 2009. Jul. 26~29, Barcelona (hereinafter referred to as technical document 2), the content of both of which is incorporated herein by reference.

The purpose of the text extraction is to decide the orientation of the scanned page by character recognition on the extracted text lines. The key requirements of the text extraction include:

1. Extraction of all text lines from images is not necessary.
2. The speed should be as fast as possible.

The traditional methods have problems for the above 2 requirements. Layout analysis based methods can not meet the speed requirement. Also, the layout analysis based methods will analyze the whole document image. If the structure of the image is very complex, text line extraction usually fails. The 2nd type of text extraction method (see technical document 2) is very fast. But it's mainly for horizontal text lines extraction from outdoor natural scene text. When the 2nd type of method is applied to scanned document images, one big problem is how to find the correct direction of the text lines in case that the scanned document includes horizontal text lines, vertical text lines, and images. The target of the present invention is a fast and reliable text line extraction from scanned document images.

SUMMARY OF THE INVENTION

Hereinafter, there is provided a brief summary about the present invention in order to provide a basic understanding on certain aspects of the invention. However, it should be understood that this summary is not an exhaustive summary about the invention. It is not intended to determine critical portions or important portions of the invention, nor does it intend to limit the scope of the invention. The object thereof is only to propose some concepts with respect to the invention in a simplified form, thereby to be a prelude of the more detailed description given later.

In light of above situations in the prior art, an object of the invention is to provide a method and apparatus for processing a document image, enabling a fast and reliable text line extraction from scanned document images, especially suitable for complex document images where layout analysis fails.

To achieve the above object, according to an aspect of the invention, there is provided a method for processing a document image including the steps of: performing horizontal text line extraction on the document image, to obtain horizontal text lines, the number of rows of the horizontal text lines being represented by Nh; performing vertical text line extraction on the document image, to obtain vertical text lines, the number of columns of the vertical text lines being represented by Nv; providing an overlapping matrix represented by MO with Nh rows and Nv columns, a value of an element represented by MO(i, j) of the ith row and the jth column of the overlapping matrix MO indicating an overlapping relation between the ith row of horizontal text lines and the jth column of vertical text lines, where $1 \leq i \leq Nh$ and $1 \leq j \leq Nv$; merging the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously; merging the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously; determining one or more text overlapping regions in the document image, based on the values of the elements of the merged overlapping matrix MO; counting the total number of strokes or pixel points in the horizontal text lines and in the vertical text lines, respectively, within one of the one or more text overlapping regions; and determining an orientation of the one of the one or more text overlapping regions is a horizontal orientation if the total number of strokes or pixel points in the horizontal text lines is larger than that in the vertical text lines, otherwise, determining the orientation of the one of the one or more text overlapping regions is a vertical orientation.

According to another aspect of the invention, there is further provided an apparatus for processing a document image including: a horizontal text line extraction unit adapted to perform horizontal text line extraction on the document image, to obtain horizontal text lines, the number of rows of the horizontal text lines being represented by Nh; a vertical text line extraction unit adapted to perform vertical text line extraction on the document image, to obtain vertical text lines, the number of columns of the vertical text lines being represented by Nv; an overlapping matrix providing unit adapted to provide an overlapping matrix represented by MO with Nh rows and Nv columns, a value of an element represented by MO(i, j) of the ith row and the jth column of the overlapping matrix MO indicating an overlapping relation between the ith row of horizontal text lines and the jth column of vertical text lines, where $1 \leq i \leq Nh$ and $1 \leq j \leq Nv$; a vertical merging unit adapted to merge the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously; a horizontal merging unit adapted to merge the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously; a text overlapping region determining unit adapted to determine one or more text overlapping regions in the document image, based on the values of the elements of the overlapping matrix MO merged by the vertical merging unit and the horizontal merging unit; a counting unit adapted to count the total number of strokes or pixel points in the horizontal text lines and in the vertical text lines, respectively, within one of the one or more text overlapping regions determined by the text overlapping region determining unit; and a text orientation determining unit adapted to determine an orientation of the one of the one or more text overlapping regions is a horizontal orientation if the total number of strokes or pixel points in the horizontal text lines counted by the counting unit is larger than that in the vertical text lines, otherwise, to determine the orientation of the one of the one or more text overlapping regions is a vertical orientation.

According to another aspect of the invention, there is further provided a computer program product for implementing the method for processing a document image above.

According to another aspect of the invention, there is further provided a machine-readable storage medium on which computer program codes for implementing the method for processing a document image above is carried.

In the technical solution of the invention mentioned above, both horizontal and vertical text line extraction are performed on the document image, one or more text overlapping regions in the document image is determined based on the overlapping relation between the horizontal text lines and the vertical text lines, and the orientation of the one of the one or more text overlapping regions is determined based on the total number of strokes or pixel points. Thus, a fast and reliable text line extraction from scanned document images is enabled, and it is especially suitable for complex document images where layout analysis fails.

BRIEF DESCRIPTION OF THE DRAWINGS

The invention can be better understood by referring to the detailed description given hereinafter in combination with the accompany drawings in which identical or similar components are denoted by identical or similar reference numbers. The accompany drawings together with the detailed description below are included in the specification and form parts of the specification for further illustrating preferred embodiments of the invention and explaining principles and advantages of the invention by way of example. Wherein:

FIG. 3 is a diagram illustrating a specific example of vertical text line extraction according to the embodiment of the invention.

Figure 1:
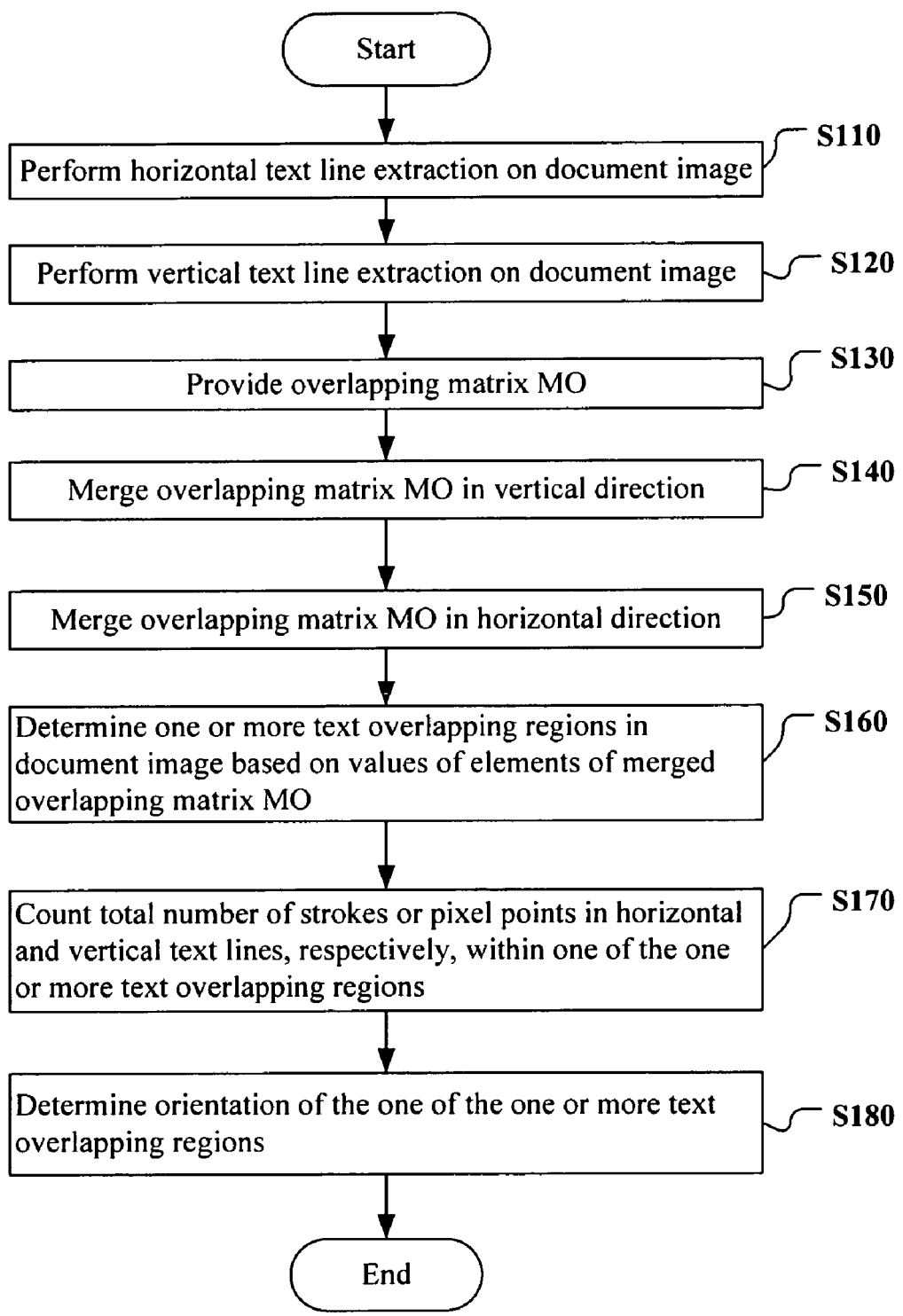
FIG. 1 is a flow chart illustrating a method for processing a document image according to an embodiment of the invention.

Those skilled in the art should understand that elements in the drawings are only shown for the purpose of simplicity and clarity, and are not necessarily drawn to scales. For example, sizes of certain elements in the drawings may be enlarged relative to other elements so that it is helpful to improve the understanding on the embodiments of the invention.

DETAILED DESCRIPTION OF THE INVENTION

Hereinafter, an exemplary embodiment of the invention will be described in combination with the drawings. For the purpose of clarity and simplicity, not all the features of the actual embodiment are described in the specification. However, it should be appreciated that it has to make a lot of decisions specific to the embodiments during a process for developing any such actual embodiments in order to achieve specific targets of developers, for example, complying with those restrictive conditions related to systems and operations, and these restrictive conditions may vary with different embodiments. Further, it should also be appreciated that although developing work may be very complex and time-consuming, such developing work is merely a routine task for those skilled in the art who benefit from the present disclosure.

Herein, there is still one point needed to be illustrated that, for preventing unnecessary details from obscuring the invention, only the device structures and/or processing steps closely related to the scheme according to the invention are shown in the drawings, and other details having little to do with the invention are omitted.

The method for processing a document image according to the embodiment of the invention is described in detail with reference to the drawings in the following.

FIG. 1 is a flow chart illustrating a method for processing a document image according to an embodiment of the invention.

Firstly, in step S110, horizontal text line extraction is performed on the document image.

A text and an image can be included in a complex document image in which the text includes both a horizontal text line and a vertical text line. After the horizontal text line extraction is performed on the document image in step S110, horizontal text lines in the document image can be obtained. Here, the number of rows of the horizontal text lines is represented by Nh.

Next, in step S120, vertical text line extraction is performed on the document image.

Vertical text lines in the document image can be obtained by performing step S120. Here, the number of columns of the vertical text lines is represented by Nv. Thus, the horizontal text lines of Nh rows and the vertical text lines of Nv columns are obtained.

There are numerous methods for specific (horizontal or vertical) text line extraction. In this regard, reference can be made to the technical document 2 and the following relevant technical document: N. Ezaki, et. Al, "Text detection from natural scene images: towards a system for visually impaired persons". International Conference on Pattern Recognition. P 683-686, 2004 (hereinafter referred to as technical document 3), the content of which is also incorporated herein by reference.

Next, in step S130, an overlapping matrix represented by MO is provided.

The overlapping matrix MO has Nh rows and Nv columns, corresponding to the number of rows of the horizontal text lines obtained in step S110 and the number of columns of the vertical text lines obtained in step S120. A value of an element represented by MO(i, j) of the ith row and the jth column of the overlapping matrix MO indicates an overlapping relation between the ith row of horizontal text lines and the jth column of vertical text lines, where $1 \leq i \leq Nh$ and $1 \leq j \leq Nv$. In other words, the purpose for providing the overlapping matrix MO is to represent the overlapping relation between each row of the horizontal text lines obtained in step S110 and each column of the vertical text lines obtained in step S120. This overlapping relation contributes to determine one or more text overlapping regions in the complex document image.

According to the preferred embodiment of the invention, MO(i, j)=0 indicates that there is no overlapping between the ith row of horizontal text lines and the jth column of vertical text lines, and MO(i, j)=i indicates that there is overlapping between the ith row of horizontal text lines and the jth column of vertical text lines. Evidently, other values can also be taken for MO(i, j) to indicate the overlapping relation between the ith row of horizontal text lines and the jth column of vertical text lines.

Next, in step S140, the overlapping matrix MO is merged in the vertical direction.

A value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously. The diversity of the values of the elements in the overlapping matrix MO is reduced through such merging. Ultimately, one or more text overlapping regions in the complex document image can be determined in accordance with the distributing condition of the elements with same value in the overlapping matrix MO.

According to the preferred embodiment of the invention, a value of an element of the overlapping matrix MO indicating an overlapping relation between a column of vertical text lines and each of a plurality of rows of horizontal text lines is set as a minimum value (or a maximum value, etc.) thereof if the column of vertical text lines overlaps with the plurality of rows of horizontal text lines simultaneously.

Next, in step S150, the overlapping matrix MO is merged in the horizontal direction.

A value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously. The diversity of the values of the elements in the overlapping matrix MO is further reduced through such merging.

According to the preferred embodiment of the invention, a value of an element of the overlapping matrix MO indicating an overlapping relation between a row of horizontal text lines and each of a plurality of columns of vertical text lines is set as a minimum value (or a maximum value, etc.) thereof if the row of horizontal text lines overlaps with the plurality of columns of vertical text lines simultaneously.

In a case that the layout of the document image is simple, the process proceeds to a next step immediately after steps S140 and S150 are performed. In a case that the layout of the document image is complex, steps S140 and S150 can be performed repeatedly, for repeating the merging of the overlapping matrix MO in the vertical direction and in the horizontal direction, until the values of the elements of the overlapping matrix MO do not change any more.

Next, in step S160, one or more text overlapping regions in the document image is determined based on the values of the elements of the merged overlapping matrix MO.

In the merged overlapping matrix MO, elements with distinct same values distribute at distinct regions. One or more text overlapping regions in the document image can be determined in accordance with the same values.

Next, in step S170, the total number of strokes or pixel points in the horizontal text lines and in the vertical text lines are counted, respectively, within one of the one or more text overlapping regions.

For every text overlapping region, more strokes or pixel points will always be gathered in the text lines in the correct orientation, and few strokes or pixel points will be gathered in the text lines in the false orientation.

Finally, in step S180, an orientation of the one of the one or more text overlapping regions is determined.

The orientation of a text overlapping region is determined as a horizontal orientation if the total number of strokes or pixel points in the horizontal text lines is larger than that in the vertical text lines. The orientation of a text overlapping region is determined as a vertical orientation if the total number of strokes or pixel points in the horizontal text lines is smaller than that in the vertical text lines. Additionally, it should be noted that, if the total number of strokes or pixel points in the horizontal text lines is just equal to that in the vertical text lines, it can not be determined whether the orientation of the text overlapping region is a horizontal or vertical orientation. In such a special case, judgment as for the orientation of the text overlapping region is not made.

With the method for processing a document image above according to the invention, one or more text overlapping regions and the correct orientations thereof can be determined rapidly from the scanned document images, and it is especially suitable for complex document images where layout analysis fails.

In a case that the orientations of the text overlapping regions in the document image have been determined, the document image is determined as in a horizontal orientation if it is determined that an orientation of each of the one or more text overlapping regions is the horizontal orientation; the document image is determined as in a vertical orientation if it is determined that the orientation of each of the one or more text overlapping regions is the vertical orientation; and the document image is determined as in a hybrid orientation if it is determined that the orientations of the one or more text overlapping regions include both the horizontal orientation and the vertical orientation.

Hereinafter, the method for processing a document image according to the invention is described in detail with reference to FIGS. 2 and 3.

Figure 2:
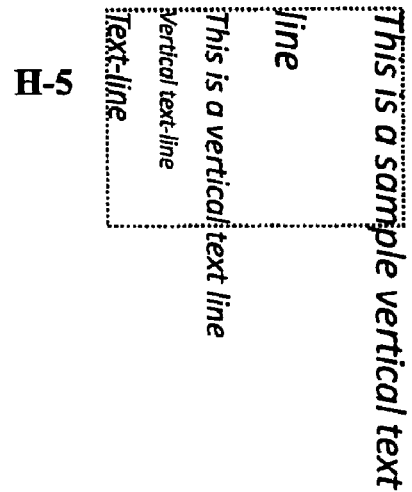
FIG. 2 is diagram illustrating a specific example of horizontal text line extraction according to the embodiment of the invention.

FIG. 2 is diagram illustrating a specific example of horizontal text line extraction according to the embodiment of the invention. As illustrated in FIG. 2, after horizontal text line extraction is performed on the document image, 5 rows of horizontal text lines represented by H-1, H-2, H-3, H-4 and H-5, respectively, are obtained.

FIG. 3 is a diagram illustrating a specific example of vertical text line extraction according to the embodiment of the invention. As illustrated in FIG. 3, after vertical text line extraction is performed on the document image, 7 columns of vertical text lines represented by V-1, V-2, V-3, V-4, V-5, V-6 and V-7, respectively, are obtained.

In accordance with the overlapping relation among the 5 rows of horizontal text lines and the 7 columns of vertical text lines, an overlapping matrix MO with 5 rows and 7 columns can be provided as shown in Table 1.

TABLE 1

|     | V-1 | V-2 | V-3 | V-4 | V-5 | V-6 | V-7 |
| --- | --- | --- | --- | --- | --- | --- | --- |
| H-1 | 1 | 0 | 0 | 0 | 0 | 0 | 0 |
| H-2 | 2 | 2 | 0 | 0 | 0 | 0 | 0 |
| H-3 | 3 | 3 | 0 | 0 | 0 | 0 | 0 |
| H-4 | 4 | 0 | 0 | 0 | 0 | 0 | 0 |
| H-5 | 0 | 0 | 5 | 5 | 5 | 5 | 5 |

As shown in Table 1, a value of an element represented by MO(i, j) of the ith row and the jth column of the overlapping matrix MO indicates an overlapping relation between the ith row of horizontal text lines and the jth column of vertical text lines. When there is no overlapping between the ith row of horizontal text lines and the jth column of vertical text lines, MO(i, j)=0. When there is overlapping between the ith row of horizontal text lines and the jth column of vertical text lines, MO(i, j)=i.

Then, the overlapping matrix MO as shown in Table 1 is merged in the vertical direction.

Firstly, the V-1 column is merged. The V-1 column of vertical text lines overlaps with the H-1, H-2, H-3 and H-4 rows of horizontal text lines simultaneously. MO(1, 1), MO(2, 1), MO(3, 1) and MO(4, 1) are scanned and a minimum value thereof which is 1 is obtained. Therefore, MO(1, 1), MO(2, 1), MO(3, 1) and MO(4, 1) are all set to be 1 and Table 2 is obtained.

TABLE 2

|     | V-1 | V-2 | V-3 | V-4 | V-5 | V-6 | V-7 |
| --- | --- | --- | --- | --- | --- | --- | --- |
| H-1 | 1 | 0 | 0 | 0 | 0 | 0 | 0 |
| H-2 | 1 | 2 | 0 | 0 | 0 | 0 | 0 |
| H-3 | 1 | 3 | 0 | 0 | 0 | 0 | 0 |
| H-4 | 1 | 0 | 0 | 0 | 0 | 0 | 0 |
| H-5 | 0 | 0 | 5 | 5 | 5 | 5 | 5 |

Then, the V-2 column is merged. The V-2 column of vertical text lines overlaps with the H-2 and H-3 rows of horizontal text lines simultaneously. MO(2, 2) and MO(3, 2) are scanned and a minimum value thereof which is 2 is obtained. Therefore, MO(2, 2) and MO(3, 2) are all set to be 2 and Table 3 is obtained.

TABLE 3

|     | V-1 | V-2 | V-3 | V-4 | V-5 | V-6 | V-7 |
| --- | --- | --- | --- | --- | --- | --- | --- |
| H-1 | 1 | 0 | 0 | 0 | 0 | 0 | 0 |
| H-2 | 1 | 2 | 0 | 0 | 0 | 0 | 0 |
| H-3 | 1 | 2 | 0 | 0 | 0 | 0 | 0 |
| H-4 | 1 | 0 | 0 | 0 | 0 | 0 | 0 |
| H-5 | 0 | 0 | 5 | 5 | 5 | 5 | 5 |

After merging of the overlapping matrix MO in the vertical direction is completed, the overlapping matrix MO as shown in Table 3 is merged in the horizontal direction.

Firstly, the H-2 row is merged. The H-2 row of horizontal text lines overlaps with the V-1 and V-2 columns of vertical text lines simultaneously. MO(2, 1) and MO(2, 2) are scanned and a minimum value thereof which is 1 is obtained. Therefore, MO(2, 1) and MO(2, 2) are all set to be 1 and Table 4 is obtained.

TABLE 4

|     | V-1 | V-2 | V-3 | V-4 | V-5 | V-6 | V-7 |
| --- | --- | --- | --- | --- | --- | --- | --- |
| H-1 | 1 | 0 | 0 | 0 | 0 | 0 | 0 |
| H-2 | 1 | 1 | 0 | 0 | 0 | 0 | 0 |
| H-3 | 1 | 2 | 0 | 0 | 0 | 0 | 0 |
| H-4 | 1 | 0 | 0 | 0 | 0 | 0 | 0 |
| H-5 | 0 | 0 | 5 | 5 | 5 | 5 | 5 |

Then, the H-3 row is merged. The H-3 row of horizontal text lines overlaps with the V-1 and V-2 columns of vertical text lines simultaneously. MO(3, 1) and MO(3, 2) are scanned and a minimum value thereof which is 1 is obtained. Therefore, MO(3, 1) and MO(3, 2) are all set to be 1 and Table 5 is obtained.

TABLE 5

|     | V-1 | V-2 | V-3 | V-4 | V-5 | V-6 | V-7 |
| --- | --- | --- | --- | --- | --- | --- | --- |
| H-1 | 1 | 0 | 0 | 0 | 0 | 0 | 0 |
| H-2 | 1 | 1 | 0 | 0 | 0 | 0 | 0 |
| H-3 | 1 | 1 | 0 | 0 | 0 | 0 | 0 |
| H-4 | 1 | 0 | 0 | 0 | 0 | 0 | 0 |
| H-5 | 0 | 0 | 5 | 5 | 5 | 5 | 5 |

Since the layout of the example of the document image as illustrated in FIGS. 2 and 3 is simple, the merging process of the overlapping matrix MO is completed after merging of the overlapping matrix MO in the vertical and horizontal directions is performed once. However, in a case that the layout of the document image is complex, it is possible to repeat the merging of the overlapping matrix MO in the vertical direction and in the horizontal direction if needed, until the values of the elements of the overlapping matrix MO do not change any more.

Next, one or more text overlapping regions in the document image are determined, based on the values of the elements of the merged overlapping matrix MO as shown in Table 5. The document image as illustrated in FIGS. 2 and 3 has two text overlapping regions. The first text overlapping region includes the H-1, H-2, H-3 and H-4 rows of horizontal text lines and the V-1 and V-2 columns of vertical text lines. The second text overlapping region includes the H-5 row of horizontal text lines and the V-3, V-4, V-5, V-6 and V-7 columns of vertical text lines.

Then, within the first text overlapping region, the total number of strokes or pixel points in the H-1, H-2, H-3 and H-4 rows of horizontal text lines and in the V-1 and V-2 columns of vertical text lines are counted, respectively. It can be seen clearly from FIGS. 2 and 3 that the total number of strokes or pixel points in the H-1, H-2, H-3 and H-4 rows of horizontal text lines is larger than that in the V-1 and V-2 columns of vertical text lines. Therefore, it can be determined that the orientation of the first text overlapping region is a horizontal orientation.

Then, within the second text overlapping region, the total number of strokes or pixel points in the H-5 row of horizontal text lines and in the V-3, V-4, V-5, V-6 and V-7 columns of vertical text lines are counted, respectively. It can be seen clearly from FIGS. 2 and 3 that the total number of strokes or pixel points in the H-5 row of horizontal text lines is smaller than that in the V-3, V-4, V-5, V-6 and V-7 columns of vertical text lines. Therefore, it can be determined that the orientation of the second text overlapping region is a vertical orientation.

Since the orientations of the text overlapping regions included in the document image as illustrated in FIGS. 2 and 3 include both the horizontal orientation and the vertical orientation, it can be determined that the document image is in a hybrid orientation.

In the example of the method for processing a document image according to the invention as described above, the overlapping matrix MO is merged in the vertical direction firstly, and then the overlapping matrix MO is merged in the horizontal direction. However, the invention is not limited thereto. For example, it is also possible that the overlapping matrix MO is merged in the horizontal direction firstly, and then the overlapping matrix MO is merged in the vertical direction. And, when the overlapping matrix MO is merged, merging can be interlaced in the vertical direction and in the horizontal direction. That is, it is not necessary that all rows of horizontal text lines are merged in the horizontal direction after merging of all columns of vertical text lines in the vertical direction is completed. Alternatively, it is possible that one row of horizontal text lines is merged in the horizontal direction immediately after merging of one column of vertical text lines in the vertical direction is completed. The invention has no special requirement for the order of emerging of the overlapping matrix MO.

The apparatus for processing a document image according to the embodiment of the invention is described in detail with reference to the drawings in the following.

Figure 4:
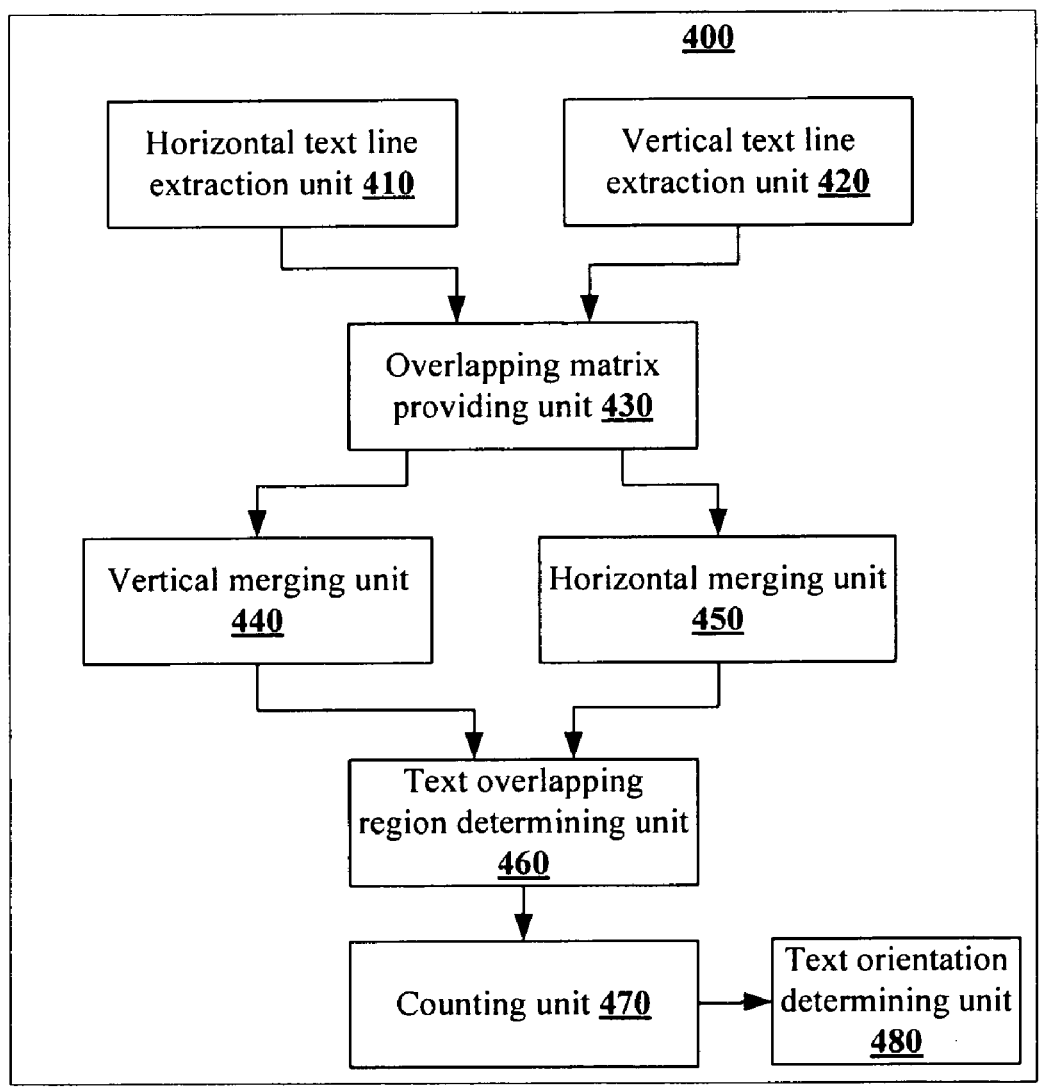
FIG. 4 is a block diagram illustrating an apparatus for processing a document image according to the embodiment of the invention.

FIG. 4 is a block diagram illustrating an apparatus 400 for processing a document image according to the embodiment of the invention.

Referring to FIG. 4, the apparatus 400 according to the embodiment of the invention includes a horizontal text line extraction unit 410, a vertical text line extraction unit 420, an overlapping matrix providing unit 430, a vertical merging unit 440, a horizontal merging unit 450, a text overlapping region determining unit 460, a counting unit 470, and a text orientation determining unit 480.

The horizontal text line extraction unit 410 is adapted to perform horizontal text line extraction on the document image, to obtain horizontal text lines, where the number of rows of the horizontal text lines is represented by Nh.

The vertical text line extraction unit 420 is adapted to perform vertical text line extraction on the document image, to obtain vertical text lines, where the number of columns of the vertical text lines is represented by Nv.

The overlapping matrix providing unit 430 is adapted to provide an overlapping matrix represented by MO with Nh rows and Nv columns, where a value of an element represented by MO(i, j) of the ith row and the jth column of the overlapping matrix MO indicates an overlapping relation between the ith row of horizontal text lines and the jth column of vertical text lines, where $1 \leq i \leq Nh$ and $1 \leq j \leq Nv$.

The vertical merging unit 440 is adapted to merge the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously.

The horizontal merging unit 450 is adapted to merge the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously.

The text overlapping region determining unit 460 is adapted to determine one or more text overlapping regions in the document image, based on the values of the elements of the overlapping matrix MO merged by the vertical merging unit 440 and the horizontal merging unit 450.

The counting unit 470 is adapted to count the total number of strokes or pixel points in the horizontal text lines and in the vertical text lines, respectively, within one of the one or more text overlapping regions determined by the text overlapping region determining unit 460.

The text orientation determining unit 480 is adapted to determine an orientation of the one of the one or more text overlapping regions is a horizontal orientation if the total number of strokes or pixel points in the horizontal text lines counted by the counting unit 470 is larger than that in the vertical text lines, otherwise, to determine the orientation of the one of the one or more text overlapping regions is a vertical orientation.

According to the embodiment of the invention, before the text overlapping region determining unit 460 determines one or more text overlapping regions in the document image, the vertical merging unit 440 and the horizontal merging unit 450 may repeat the merging of the overlapping matrix MO in the vertical direction and in the horizontal direction until the values of the elements of the overlapping matrix MO do not change any more.

According to the embodiment of the invention, MO(i, j)=0 indicates that there is no overlapping between the ith row of horizontal text lines and the jth column of vertical text lines, and MO(i, j)=i indicates that there is overlapping between the ith row of horizontal text lines and the jth column of vertical text lines. The vertical merging unit 440 sets a value of an element of the overlapping matrix MO indicating an overlapping relation between a column of vertical text lines and each of a plurality of rows of horizontal text lines as a minimum value thereof if the column of vertical text lines overlaps with the plurality of rows of horizontal text lines simultaneously. The horizontal merging unit 450 sets a value of an element of the overlapping matrix MO indicating an overlapping relation between a row of horizontal text lines and each of a plurality of columns of vertical text lines as a minimum value thereof if the row of horizontal text lines overlaps with the plurality of columns of vertical text lines simultaneously.

According to the embodiment of the invention, the apparatus 400 may further include an image orientation determining unit (not shown) adapted to: determine the document image is in a horizontal orientation if the text orientation determining unit 480 determines that an orientation of each of the one or more text overlapping regions is the horizontal orientation; determine the document image is in a vertical orientation if the text orientation determining unit 480 determines that the orientation of each of the one or more text overlapping regions is the vertical orientation; and determine the document image is in a hybrid orientation if the text orientation determining unit 480 determines that the orientations of the one or more text overlapping regions include both the horizontal orientation and the vertical orientation.

The various specific implementations of the respective units above in the apparatus 400 have been described in detail previously, and therefore the explanations thereof will not be repeated herein.

Apparently, respective operating processes of the method above according to the invention can be implemented in a manner of a computer executable program stored on a machine-readable storage medium.

And, the object of the invention can be implemented in a manner that the storage medium on which the computer executable program above is carried is provided directly or indirectly to a system or apparatus, a computer or a Central Processing Unit (CPU) of which reads out and executes the computer executable program. Here, the implementation of the invention is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage units, a semiconductor device, a disk unit such as an optic disk, a magnetic disk and a magneto-optic disk, and other medium suitable for storing information.

Additionally, the invention can also be implemented by connecting to a corresponding web site on the Internet through a computer, downloading and installing the computer executable program according to the invention into the computer, and then executing the program.

In the apparatus and method of the invention, it is obvious that respective components or steps can be decomposed and/or recombined. Such decomposition and/or recombination should be considered as an equivalent solution of the invention. And, the steps performing a series of processing above can be performed in the describing order naturally, but this is not necessary. Some steps can be performed concurrently or independently with one another.

Although the embodiment of the invention has been described in detail in combination with the drawings above, it should be understood that, the embodiment described above is only used to explain the invention and is not constructed as the limitation to the invention. For those skilled in the art, various modification and alternation can be made to the above embodiment without departing from the essential and scope of the invention. Therefore, the scope of the invention is only defined by the appended claims and the equivalents thereof.

It is known from the description of the embodiment of the invention above that the technical solution covered by the invention includes but is not limited to the following.

APPENDIX 1

A method for processing a document image, comprising:

performing horizontal text line extraction on the document image, to obtain horizontal text lines, the number of rows of the horizontal text lines being represented by Nh;

performing vertical text line extraction on the document image, to obtain vertical text lines, the number of columns of the vertical text lines being represented by Nv;

providing an overlapping matrix represented by MO with Nh rows and Nv columns, a value of an element represented by MO(i, j) of the ith row and the jth column of the overlapping matrix MO indicating an overlapping relation between the ith row of horizontal text lines and the jth column of vertical text lines, where $1 \leq i \leq Nh$ and $1 \leq j \leq Nv$;

merging the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously;

merging the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously;

determining one or more text overlapping regions in the document image, based on the values of the elements of the merged overlapping matrix MO;

counting the total number of strokes or pixel points in the horizontal text lines and in the vertical text lines, respectively, within one of the one or more text overlapping regions; and determining an orientation of the one of the one or more text overlapping regions is a horizontal orientation if the total number of strokes or pixel points in the horizontal text lines is larger than that in the vertical text lines, otherwise, determining the orientation of the one of the one or more text overlapping regions is a vertical orientation.

APPENDIX 2

The method according to appendix 1, further comprising:
before determining one or more text overlapping regions in the document image, repeating the merging of the overlapping matrix MO in the vertical direction and in the horizontal direction until the values of the elements of the overlapping matrix MO do not change any more.

APPENDIX 3

The method according to appendix 1 or 2, wherein $MO(i, j)=0$ indicates that there is no overlapping between the ith row of horizontal text lines and the jth column of vertical text lines;

$MO(i, j)=i$ indicates that there is overlapping between the ith row of horizontal text lines and the jth column of vertical text lines;

a value of an element of the overlapping matrix MO indicating an overlapping relation between a column of vertical text lines and each of a plurality of rows of horizontal text lines is set as a minimum value thereof if the column of vertical text lines overlaps with the plurality of rows of horizontal text lines simultaneously; and a value of an element of the overlapping matrix MO indicating an overlapping relation between a row of horizontal text lines and each of a plurality of columns of vertical text lines is set as a minimum value thereof if the row of horizontal text lines overlaps with the plurality of columns of vertical text lines simultaneously.

APPENDIX 4

The method according to appendix 1, further comprising:
determining the document image is in a horizontal orientation if it is determined that an orientation of each of the one or more text overlapping regions is the horizontal orientation;

determining the document image is in a vertical orientation if it is determined that the orientation of each of the one or more text overlapping regions is the vertical orientation; and determining the document image is in a hybrid orientation if it is determined that the orientations of the one or more text overlapping regions include both the horizontal orientation and the vertical orientation.

APPENDIX 5

An apparatus for processing a document image, comprising:
a horizontal text line extraction unit adapted to perform horizontal text line extraction on the document image, to obtain horizontal text lines, the number of rows of the horizontal text lines being represented by Nh;

a vertical text line extraction unit adapted to perform vertical text line extraction on the document image, to obtain vertical text lines, the number of columns of the vertical text lines being represented by Nv;

an overlapping matrix providing unit adapted to provide an overlapping matrix represented by MO with Nh rows and Nv columns, a value of an element represented by MO(i, j) of the ith row and the jth column of the overlapping matrix MO indicating an overlapping relation between the ith row of horizontal text lines and the jth column of vertical text lines, where $1 \leq i \leq Nh$ and $1 \leq j \leq Nv$;

a vertical merging unit adapted to merge the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously;

a horizontal merging unit adapted to merge the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously;

a text overlapping region determining unit adapted to determine one or more text overlapping regions in the document image, based on the values of the elements of the overlapping matrix MO merged by the vertical merging unit and the horizontal merging unit;

a counting unit adapted to count the total number of strokes or pixel points in the horizontal text lines and in the vertical text lines, respectively, within one of the one or more text overlapping regions determined by the text overlapping region determining unit; and a text orientation determining unit adapted to determine an orientation of the one of the one or more text overlapping regions is a horizontal orientation if the total number of strokes or pixel points in the horizontal text lines counted by the counting unit is larger than that in the vertical text lines, otherwise, to determine the orientation of the one of the one or more text overlapping regions is a vertical orientation.

APPENDIX 6

The apparatus according to appendix 5, wherein, before the text overlapping region determining unit determines one or more text overlapping regions in the document image, the vertical merging unit and the horizontal merging unit repeat the merging of the overlapping matrix MO in the vertical direction and in the horizontal direction until the values of the elements of the overlapping matrix MO do not change any more.

APPENDIX 7

The apparatus according to appendix 5 or 6, wherein
MO(i, j)=0 indicates that there is no overlapping between the ith row of horizontal text lines and the jth column of vertical text lines;
MO(i, j)=i indicates that there is overlapping between the ith row of horizontal text lines and the jth column of vertical text lines;
the vertical merging unit sets a value of an element of the overlapping matrix MO indicating an overlapping relation between a column of vertical text lines and each of a plurality of rows of horizontal text lines as a minimum value thereof if the column of vertical text lines overlaps with the plurality of rows of horizontal text lines simultaneously; and the horizontal merging unit sets a value of an element of the overlapping matrix MO indicating an overlapping relation between a row of horizontal text lines and each of a plurality of columns of vertical text lines as a minimum value thereof if the row of horizontal text lines overlaps with the plurality of columns of vertical text lines simultaneously.

APPENDIX 8

The apparatus according to appendix 5, further comprising an image orientation determining unit adapted to:

determine the document image is in a horizontal orientation if the text orientation determining unit determines that an orientation of each of the one or more text overlapping regions is the horizontal orientation;

determine the document image is in a vertical orientation if the text orientation determining unit determines that the orientation of each of the one or more text overlapping regions is the vertical orientation; and determine the document image is in a hybrid orientation if the text orientation determining unit determines that the orientations of the one or more text overlapping regions include both the horizontal orientation and the vertical orientation.

APPENDIX 9

A program product comprising a machine-readable instruction code stored therein, wherein the instruction code, when read and executed by a computer, enables the computer to execute the method according to any of appendixes 1-4.

APPENDIX 10

A machine-readable storage medium on which the program product according to appendix 9 is carried.

The invention claimed is:

1. A method for processing a document image, comprising:
performing horizontal text line extraction on the document image, to obtain horizontal text lines, the number of rows of the horizontal text lines being represented by Nh;
performing vertical text line extraction on the document image, to obtain vertical text lines, the number of columns of the vertical text lines being represented by Nv;
providing an overlapping matrix represented by MO with Nh rows and Nv columns, a value of an element represented by MO(i, j) of the ith row and the jth column of the overlapping matrix MO indicating an overlapping relation between the ith row of horizontal text lines and the jth column of vertical text lines, where $1 \leq i \leq Nh$ and $1 \leq j \leq Nv$;
merging the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously;
merging the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously;

determining one or more text overlapping regions in the document image, based on the values of the elements of the merged overlapping matrix MO;

counting the total number of strokes or pixel points in the horizontal text lines and in the vertical text lines, respectively, within one of the one or more text overlapping regions; and determining an orientation of the one of the one or more text overlapping regions is a horizontal orientation if the total number of strokes or pixel points in the horizontal text lines is larger than that in the vertical text lines, otherwise, determining the orientation of the one of the one or more text overlapping regions is a vertical orientation.

2. The method according to claim 1, further comprising:

before determining one or more text overlapping regions in the document image, repeating the merging of the overlapping matrix MO in the vertical direction and in the horizontal direction until the values of the elements of the overlapping matrix MO do not change any more.

3. The method according to claim 1, wherein $MO(i, j)=0$ indicates that there is no overlapping between the ith row of horizontal text lines and the jth column of vertical text lines;

$MO(i, j)=i$ indicates that there is overlapping between the ith row of horizontal text lines and the jth column of vertical text lines;

a value of an element of the overlapping matrix MO indicating an overlapping relation between a column of vertical text lines and each of a plurality of rows of horizontal text lines is set as a minimum value thereof if the column of vertical text lines overlaps with the plurality of rows of horizontal text lines simultaneously; and a value of an element of the overlapping matrix MO indicating an overlapping relation between a row of horizontal text lines and each of a plurality of columns of vertical text lines is set as a minimum value thereof if the row of horizontal text lines overlaps with the plurality of columns of vertical text lines simultaneously.

4. The method according to claim 1, further comprising:

determining the document image is in a horizontal orientation if it is determined that an orientation of each of the one or more text overlapping regions is the horizontal orientation;

determining the document image is in a vertical orientation if it is determined that the orientation of each of the one or more text overlapping regions is the vertical orientation; and determining the document image is in a hybrid orientation if it is determined that the orientations of the one or more text overlapping regions include both the horizontal orientation and the vertical orientation.

5. An apparatus for processing a document image, comprising:

a horizontal text line extraction unit adapted to perform horizontal text line extraction on the document image, to obtain horizontal text lines, the number of rows of the horizontal text lines being represented by Nh;

a vertical text line extraction unit adapted to perform vertical text line extraction on the document image, to obtain vertical text lines, the number of columns of the vertical text lines being represented by Nv;

an overlapping matrix providing unit adapted to provide an overlapping matrix represented by MO with Nh rows and Nv columns, a value of an element represented by $MO(i, j)$ of the ith row and the jth column of the overlapping matrix MO indicating an overlapping relation between the ith row of horizontal text lines and the jth column of vertical text lines, where $1 \leq i \leq Nh$ and $1 \leq j \leq Nv$;

a vertical merging unit adapted to merge the overlapping matrix MO in the vertical direction, so that a value of an element of the overlapping matrix MO indicating an overlapping relation between a column of vertical text lines and each of a plurality of rows of horizontal text lines is set as a same value if the column of vertical text lines overlaps with the plurality of rows of horizontal text lines simultaneously;

a horizontal merging unit adapted to merge the overlapping matrix MO in the horizontal direction, so that a value of an element of the overlapping matrix MO indicating an overlapping relation between a row of horizontal text lines and each of a plurality of columns of vertical text lines is set as a same value if the row of horizontal text lines overlaps with the plurality of columns of vertical text lines simultaneously;

a text overlapping region determining unit adapted to determine one or more text overlapping regions in the document image, based on the values of the elements of the overlapping matrix MO merged by the vertical merging unit and the horizontal merging unit;

a counting unit adapted to count the total number of strokes or pixel points in the horizontal text lines and in the vertical text lines, respectively, within one of the one or more text overlapping regions determined by the text overlapping region determining unit; and a text orientation determining unit adapted to determine an orientation of the one of the one or more text overlapping regions is a horizontal orientation if the total number of strokes or pixel points in the horizontal text lines counted by the counting unit is larger than that in the vertical text lines, otherwise, to determine the orientation of the one of the one or more text overlapping regions is a vertical orientation.

6. The apparatus according to claim 5, wherein, before the text overlapping region determining unit determines one or more text overlapping regions in the document image, the vertical merging unit and the horizontal merging unit repeat the merging of the overlapping matrix MO in the vertical direction and in the horizontal direction until the values of the elements of the overlapping matrix MO do not change any more.

7. The apparatus according to claim 5, wherein $MO(i, j)=0$ indicates that there is no overlapping between the ith row of horizontal text lines and the jth column of vertical text lines;

$MO(i, j)=i$ indicates that there is overlapping between the ith row of horizontal text lines and the jth column of vertical text lines;

the vertical merging unit sets a value of an element of the overlapping matrix MO indicating an overlapping relation between a column of vertical text lines and each of a plurality of rows of horizontal text lines as a minimum value thereof if the column of vertical text lines overlaps with the plurality of rows of horizontal text lines simultaneously; and the horizontal merging unit sets a value of an element of the overlapping matrix MO indicating an overlapping relation between a row of horizontal text lines and each of a plurality of columns of vertical text lines as a minimum value thereof if the row of horizontal text lines overlaps with the plurality of columns of vertical text lines simultaneously.

8. The apparatus according to claim 5, further comprising an image orientation determining unit adapted to:

determine the document image is in a horizontal orientation if the text orientation determining unit determines that an orientation of each of the one or more text overlapping regions is the horizontal orientation;

determine the document image is in a vertical orientation if the text orientation determining unit determines that the orientation of each of the one or more text overlapping regions is the vertical orientation; and determine the document image is in a hybrid orientation if the text orientation determining unit determines that the orientations of the one or more text overlapping regions include both the horizontal orientation and the vertical orientation.

* * * * *